(12) United States Patent
Webb et al.

(10) Patent No.: US 8,177,129 B2
(45) Date of Patent: May 15, 2012

(54) INTERACTIVE MULTIMEDIA SMART AFFINITY CARD WITH FLASH MEMORY

(75) Inventors: Richard S. Webb, Newport Beach, CA (US); Randall P. Bertuccelli, Walnut Creek, CA (US)

(73) Assignee: Timothy D. Larin, San Ramon, CA (US)

( * ) Notice: Subject to any disclaimer, the term of this patent is extended or adjusted under 35 U.S.C. 154(b) by 201 days.

(21) Appl. No.: 12/476,197

(22) Filed: Jun. 1, 2009

(65) Prior Publication Data

US 2009/0236430 A1    Sep. 24, 2009

Related U.S. Application Data

(63) Continuation-in-part of application No. 11/737,698, filed on Apr. 19, 2007, now Pat. No. 7,540,412, which is a continuation of application No. 11/060,210, filed on Feb. 16, 2005, now Pat. No. 7,213,749.

(60) Provisional application No. 60/545,418, filed on Feb. 17, 2004.

(51) Int. Cl.
| | |
|---|---|
| *G06Q 40/00* | (2012.01) |
| *G07D 11/00* | (2006.01) |
| *G07F 19/00* | (2006.01) |
| *G06K 5/00* | (2006.01) |
| *G06K 7/00* | (2006.01) |
| *G06K 19/00* | (2006.01) |
| *G06K 19/06* | (2006.01) |
| *G06F 7/08* | (2006.01) |

(52) U.S. Cl. ........ 235/380; 235/379; 235/381; 235/435; 235/487; 235/492; 235/493

(58) Field of Classification Search .................. 235/435, 235/487, 492, 493, 379–381
See application file for complete search history.

(56) References Cited

U.S. PATENT DOCUMENTS

| | | | | |
|---|---|---|---|---|
| 687,150 | A | * 11/1901 | Freeman | ............... 217/43 R |
| 4,141,400 | A | * 2/1979 | Mangan | ............... 206/39.6 |
| 4,390,978 | A | 6/1983 | Pollack | |

(Continued)

FOREIGN PATENT DOCUMENTS

EP          1 291 815 A2    3/2003

(Continued)

OTHER PUBLICATIONS

"Super-thin USB" Supplier: Xiamen Maifu Lai Trade Co., Ltd., url: http://www.alibaba.com/product-gs/273867760/usb_card_card_usb_usb_connector.html, 3 pages.

(Continued)

*Primary Examiner* — Daniel Walsh
(74) *Attorney, Agent, or Firm* — Convergent Law Group LLP

(57) ABSTRACT

A multipurpose card, including a multimedia card portion with tiny protrusions on its face and a second card portion with tiny recesses which mate with the protrusions, wherein the two card portions easily connect and come apart. The multimedia card portion includes a flash memory device, which can be a removable, and a plug for programming the flash memory device. The multimedia card portion can also include an elongated finger hole and 'wings.' The finger hole and wings allow a user to grip the multimedia card in one hand with a thumb and middle/ring finger and pop apart the second card portion with an index finger.

22 Claims, 12 Drawing Sheets

U.S. PATENT DOCUMENTS

| | | | |
|---|---|---|---|
| 4,428,483 A * | 1/1984 | Narita et al. | 206/459.1 |
| 4,463,849 A | 8/1984 | Prusak et al. | |
| 4,669,078 A | 5/1987 | Ogusu | |
| 4,711,347 A * | 12/1987 | Drexler et al. | 206/38 |
| 4,773,058 A * | 9/1988 | Petruchik et al. | 720/642 |
| 4,868,373 A * | 9/1989 | Opheij et al. | 235/380 |
| 4,879,710 A | 11/1989 | Iijima | |
| 5,377,825 A | 1/1995 | Sykes et al. | |
| 5,526,233 A * | 6/1996 | Hayakawa | 361/737 |
| 5,548,571 A | 8/1996 | Mistretta | |
| 5,725,931 A | 3/1998 | Landin et al. | |
| 5,844,757 A * | 12/1998 | Rose | 360/131 |
| 5,877,488 A * | 3/1999 | Klatt et al. | 235/486 |
| 5,895,909 A | 4/1999 | Yoshida | |
| 5,944,180 A | 8/1999 | Koh et al. | |
| 5,982,736 A | 11/1999 | Pierson | |
| 6,016,298 A * | 1/2000 | Fischer | 720/745 |
| 6,040,773 A | 3/2000 | Vega et al. | |
| 6,078,557 A | 6/2000 | Pierson | |
| 6,122,145 A | 9/2000 | Hoyle | |
| 6,181,664 B1 | 1/2001 | Kano et al. | |
| 6,193,163 B1 * | 2/2001 | Fehrman et al. | 235/488 |
| 6,243,356 B1 | 6/2001 | Rubino, III | |
| 6,283,282 B1 | 9/2001 | Wong et al. | |
| 6,304,544 B1 | 10/2001 | Pierson et al. | |
| 6,307,830 B1 | 10/2001 | Shultz | |
| 6,349,822 B1 | 2/2002 | Greene | |
| 6,400,675 B1 | 6/2002 | Everidge et al. | |
| 6,418,113 B1 * | 7/2002 | Ikebe et al. | 720/738 |
| 6,424,616 B1 | 7/2002 | Al-Askari | |
| 6,443,299 B2 | 9/2002 | Kuremoto et al. | |
| 6,450,332 B1 | 9/2002 | Courchesne | |
| 6,463,026 B1 | 10/2002 | Anderson | |
| 6,467,616 B2 | 10/2002 | Hegarty et al. | |
| 6,477,058 B1 * | 11/2002 | Luebs et al. | 361/784 |
| 6,484,940 B1 | 11/2002 | Dilday et al. | |
| 6,510,124 B1 | 1/2003 | Wood | |
| 6,542,444 B1 * | 4/2003 | Rutsche | 369/14 |
| 6,547,068 B2 | 4/2003 | Chu | |
| 6,561,671 B2 | 5/2003 | Wang et al. | |
| 6,597,653 B1 | 7/2003 | Burnett | |
| 6,616,052 B2 | 9/2003 | Tseng et al. | |
| 6,698,586 B2 | 3/2004 | Sankey et al. | |
| 6,726,007 B2 | 4/2004 | Huang | |
| 6,749,114 B2 | 6/2004 | Madani | |
| 6,762,988 B2 | 7/2004 | Wood | |
| 6,782,548 B2 | 8/2004 | Takizawa et al. | |
| 6,789,261 B2 | 9/2004 | Oishi | |
| 6,814,286 B2 * | 11/2004 | Cheung | 235/440 |
| 6,832,730 B2 | 12/2004 | Conner et al. | |
| 6,844,859 B2 | 1/2005 | Noda et al. | |
| 6,857,575 B2 * | 2/2005 | Mathias et al. | 235/487 |
| 6,860,388 B2 | 3/2005 | Boorman | |
| 6,874,158 B2 | 3/2005 | Chan et al. | |
| 6,907,986 B2 | 6/2005 | Kuremoto et al. | |
| 7,055,687 B2 | 6/2006 | Bruet-Ferreol | |
| 7,108,649 B2 * | 9/2006 | Reinecke et al. | 493/143 |
| 7,117,512 B1 | 10/2006 | Cahill | |
| 7,191,459 B2 | 3/2007 | Ito et al. | |
| 7,213,749 B2 * | 5/2007 | Webb et al. | 235/380 |
| 7,278,570 B2 | 10/2007 | McGee et al. | |
| 7,306,160 B2 * | 12/2007 | Takiar et al. | 235/492 |
| 7,344,072 B2 * | 3/2008 | Gonzalez et al. | 235/441 |
| 7,475,816 B1 * | 1/2009 | Rochelo | 235/386 |
| 7,523,870 B2 * | 4/2009 | Lowe | 235/486 |
| 7,540,412 B2 * | 6/2009 | Webb et al. | 235/380 |
| 7,988,061 B2 * | 8/2011 | Cook et al. | 235/493 |
| 2002/0006103 A1 | 1/2002 | Duroj | |
| 2002/0027090 A1 | 3/2002 | Sankey et al. | |
| 2002/0027837 A1 * | 3/2002 | Weber | 369/14 |
| 2002/0038769 A1 | 4/2002 | Hegarty et al. | |
| 2002/0056654 A1 | 5/2002 | Carman et al. | |
| 2002/0085343 A1 * | 7/2002 | Wu et al. | 361/683 |
| 2002/0085352 A1 * | 7/2002 | Wu et al. | 361/687 |
| 2002/0085375 A1 | 7/2002 | Wang et al. | |
| 2002/0136557 A1 * | 9/2002 | Shimamura | 396/535 |
| 2002/0154597 A1 * | 10/2002 | Chan et al. | 369/289 |
| 2002/0167890 A2 * | 11/2002 | Duroj | 369/273 |
| 2003/0014891 A1 * | 1/2003 | Nelms et al. | 40/649 |
| 2003/0024995 A1 * | 2/2003 | Conner et al. | 235/492 |
| 2003/0040940 A1 | 2/2003 | Nehammer | |
| 2003/0041203 A1 * | 2/2003 | Jones et al. | 710/301 |
| 2003/0090992 A1 | 5/2003 | Lim et al. | |
| 2003/0111539 A1 * | 6/2003 | Cheung | 235/487 |
| 2003/0132300 A1 * | 7/2003 | Dilday et al. | 235/487 |
| 2003/0136846 A1 * | 7/2003 | Higgins et al. | 235/487 |
| 2003/0139163 A1 | 7/2003 | Noda et al. | |
| 2003/0155425 A1 * | 8/2003 | Lynch | 235/492 |
| 2003/0173409 A1 * | 9/2003 | Vogt et al. | 235/492 |
| 2003/0205491 A1 | 11/2003 | Huang | |
| 2004/0026274 A1 | 2/2004 | Bruet-Ferreol | |
| 2004/0039745 A1 * | 2/2004 | Evans et al. | 707/100 |
| 2004/0042323 A1 | 3/2004 | Moshayedi | 365/232 |
| 2004/0050939 A1 * | 3/2004 | Mathias et al. | 235/487 |
| 2004/0055910 A1 | 3/2004 | Boorman | |
| 2004/0056102 A1 * | 3/2004 | Cheung | 235/486 |
| 2004/0074790 A1 | 4/2004 | Kuremoto et al. | |
| 2004/0089717 A1 * | 5/2004 | Harari et al. | 235/441 |
| 2004/0169088 A1 * | 9/2004 | Nelms et al. | 235/493 |
| 2004/0173480 A1 | 9/2004 | Reinecke et al. | |
| 2004/0188530 A1 * | 9/2004 | Cook et al. | 235/486 |
| 2004/0242270 A1 | 12/2004 | Bhatt et al. | |
| 2004/0252601 A1 | 12/2004 | Nagatomo et al. | |
| 2005/0001041 A1 * | 1/2005 | McCarthy et al. | 235/492 |
| 2005/0061889 A1 | 3/2005 | McGee et al. | |
| 2005/0066626 A1 | 3/2005 | Hutcheon | |
| 2005/0077348 A1 * | 4/2005 | Hendrick | 235/380 |
| 2005/0109841 A1 * | 5/2005 | Ryan et al. | 235/380 |
| 2005/0126698 A1 | 6/2005 | Speer | |
| 2005/0140381 A1 * | 6/2005 | Sporck et al. | 324/754 |
| 2005/0150796 A1 * | 7/2005 | Wong et al. | 206/320 |
| 2005/0155879 A1 | 7/2005 | Hoogland | |
| 2005/0157462 A1 * | 7/2005 | Sugawara et al. | 361/684 |
| 2005/0162823 A1 * | 7/2005 | Hosey | 361/684 |
| 2005/0167294 A1 | 8/2005 | Swayne | |
| 2005/0193407 A1 * | 9/2005 | Lessard | 720/728 |
| 2005/0194450 A1 * | 9/2005 | Webb et al. | 235/487 |
| 2005/0224378 A1 | 10/2005 | Hoogland | |
| 2005/0225950 A1 * | 10/2005 | Matsuda et al. | 361/737 |
| 2005/0237073 A1 * | 10/2005 | Miller et al. | 324/754 |
| 2006/0021884 A1 | 2/2006 | Castritis | |
| 2006/0038023 A1 * | 2/2006 | Brewer et al. | 235/492 |
| 2006/0048167 A1 | 3/2006 | Volk et al. | |
| 2006/0067183 A1 | 3/2006 | Hattori et al. | |
| 2006/0079133 A1 * | 4/2006 | Kim | 439/630 |
| 2006/0124749 A1 | 6/2006 | Osborn et al. | |
| 2006/0144751 A1 * | 7/2006 | Tsang | 206/707 |
| 2006/0157554 A1 * | 7/2006 | Halbur et al. | 235/380 |
| 2006/0157556 A1 * | 7/2006 | Halbur et al. | 235/380 |
| 2006/0171074 A1 * | 8/2006 | Wagner et al. | 360/133 |
| 2006/0171290 A1 | 8/2006 | Shinotsuka et al. | |
| 2006/0179449 A1 | 8/2006 | Kurita et al. | |
| 2006/0181806 A1 * | 8/2006 | Fahimi et al. | 360/131 |
| 2006/0182009 A1 | 8/2006 | Horie | |
| 2006/0198281 A1 | 9/2006 | Corley et al. | |
| 2006/0208066 A1 * | 9/2006 | Finn et al. | 235/380 |
| 2006/0237539 A1 * | 10/2006 | Chang et al. | 235/441 |
| 2006/0278723 A1 * | 12/2006 | Dan et al. | 235/492 |
| 2007/0086277 A1 | 4/2007 | Wood | |
| 2007/0190861 A1 * | 8/2007 | Webb et al. | 439/630 |
| 2007/0251999 A1 | 11/2007 | Bohlke, III et al. | |
| 2007/0252010 A1 * | 11/2007 | Gonzalez et al. | 235/492 |
| 2007/0267502 A1 | 11/2007 | Zellner et al. | |
| 2008/0023371 A1 * | 1/2008 | Macor | 206/775 |
| 2008/0083828 A1 * | 4/2008 | Le | 235/441 |
| 2008/0272010 A1 * | 11/2008 | Friedman | 206/39.6 |
| 2009/0301909 A1 * | 12/2009 | Tang et al. | 206/307.1 |
| 2010/0250812 A1 * | 9/2010 | Webb et al. | 710/301 |
| 2010/0258459 A1 * | 10/2010 | Tang et al. | 206/307.1 |
| 2011/0167201 A1 * | 7/2011 | Huang | 711/103 |

FOREIGN PATENT DOCUMENTS

| | | |
|---|---|---|
| EP | 1 085 514 B1 | 9/2004 |
| JP | 08-282765 A | 10/1996 |
| WO | WO 02/097819 A1 | 12/2002 |
| WO | WO 03/065375 A2 | 8/2003 |

OTHER PUBLICATIONS

"Super-skinny USB flash card," url: http://gizmodo.com/203617/usb-flash-card-is-wafer+thin-holds-a-gig, 1 page.
"Wallet Flash-512MB," url: http://www.walletex.com/View Products.asp?id=3, 2 pages.
"Optical Disc Packaging," Wikipedia, http://en.wikipedia.org/wiki/Cd_case, Feb. 15, 2007, 7 pgs.
"Upgrading and Repairing PCs Eighth Edition—17—CD-ROM Drives", http://lib.daemon.am/Books/Upgrading_PC/ch17/ch17.htm, Feb. 15, 2007, 31 pgs.

* cited by examiner

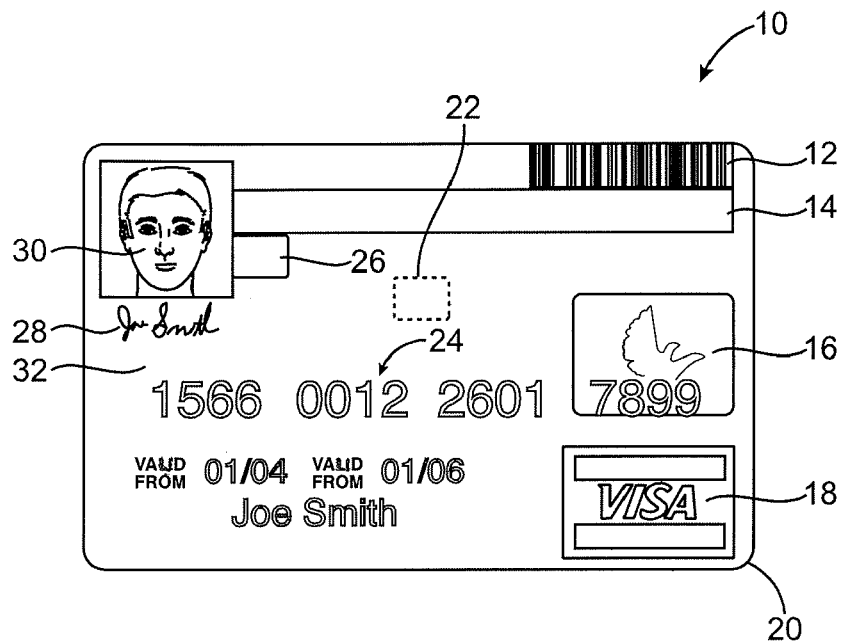
FIG. 1
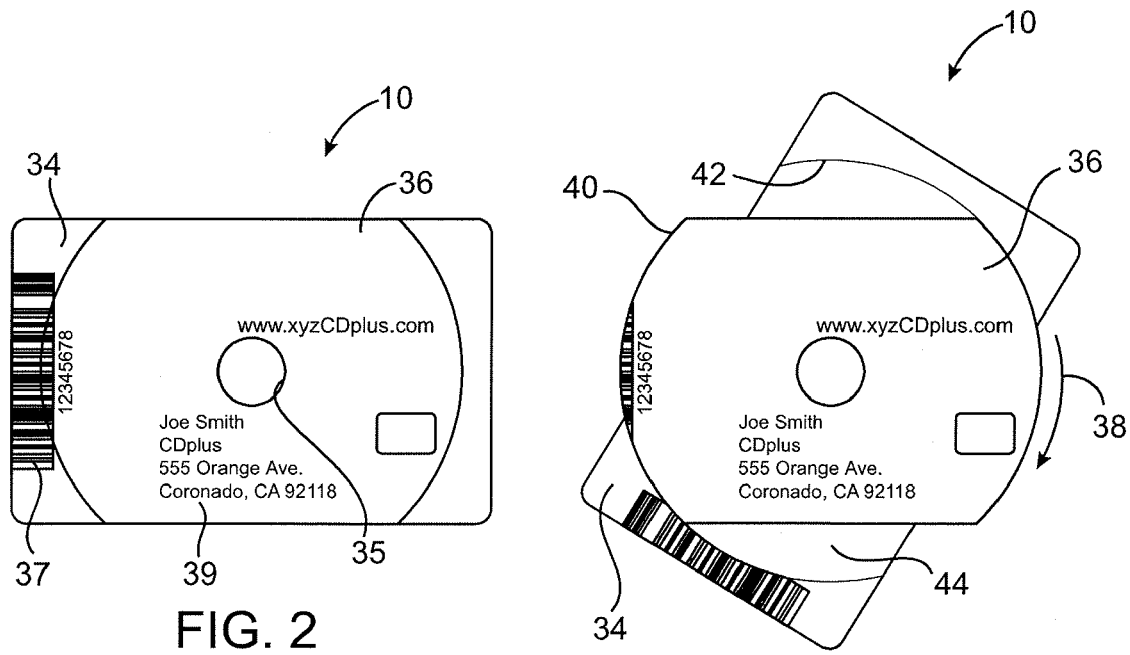
FIG. 2
FIG. 3

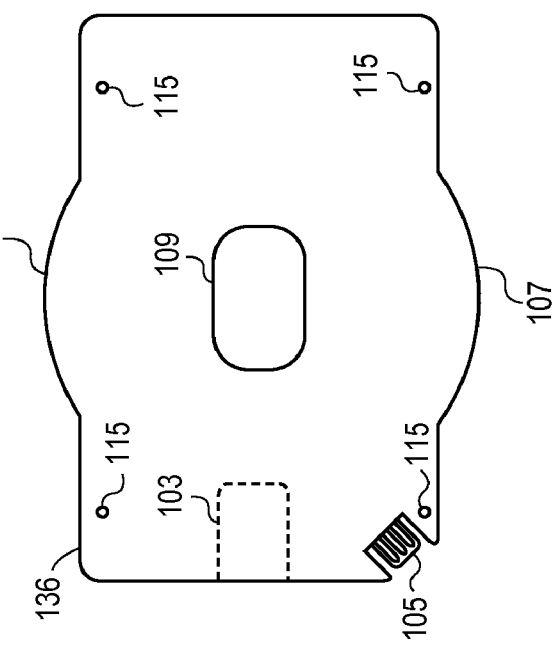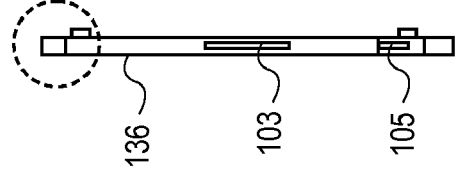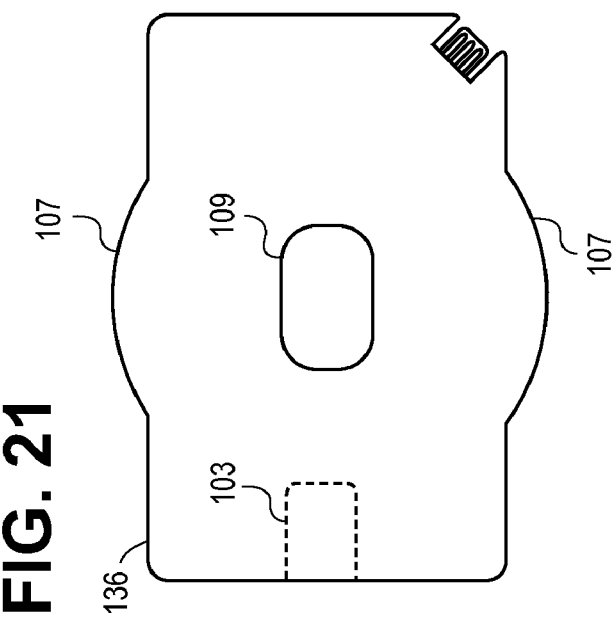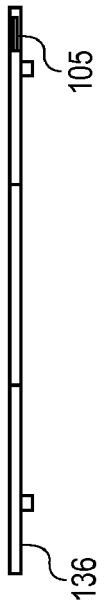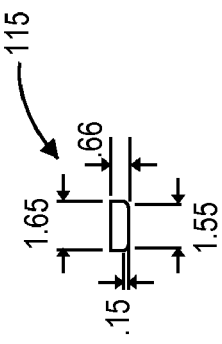

INTERACTIVE MULTIMEDIA SMART AFFINITY CARD WITH FLASH MEMORY

CROSS-REFERENCES TO RELATED APPLICATIONS

This application is a continuation-in-part of application Ser. No. 11/737,698, filed Apr. 19, 2007 (to be issued Jun. 2, 2009 as U.S. Pat. No. 7,540,412), which is a continuation of application Ser. No. 11/060,210, filed Feb. 16, 2005 (issued May 8, 2007 as U.S. Pat. No. 7,213,749), which claims the benefit of provisional Application No. 60/545,418, filed Feb. 17, 2004. All of the preceding applications are hereby incorporated by reference in their entireties.

FIELD OF DISCLOSURE

Disclosed is an interactive multimedia smart card, and more particularly, an interactive multimedia smart card that stores digital information utilizing a solid state memory device such as a flash memory, including affinity card, smart card, debit card, and credit card capabilities.

BACKGROUND OF THE DISCLOSURE

Many attempts have been made to combine the benefits of storing digital media through Compact Disk (CD) or Digital Versatile Disc (DVD) technology with a banking or affinity card. Nevertheless, digital media, such as CDs or DVDs are required to have a thickness that is standard in the computer industry to allow the digital information to be read from the digital media. For example, a typical CD is approximately 1.2 millimeters (mm) in thickness.

In contrast, a typical credit card is approximately 30 mil (0.76 mm) in thickness, and this is the standard thickness for credit cards since it is desirable for credit cards to have a standard thickness that may be inserted into a credit card reader for reading information or data that is stored on a magnetic strip. Therefore, to date, it has been a challenge to provide a banking card that may be inserted into the corresponding machines for the reading of information from the bank card in a CD or DVD reader.

Along with issues of thickness, CD and DVD technology, which is optically read and written, can be hindered by scratches, abrasions, and other fouling of the clear material that encapsulates the data layer. Scratches can interfere with the reading from or writing to the data layer of the CD/DVD. Also, current CD/DVD technology is limited in the number of layers of data that can be read by a laser reader. Because the number of layers are limited, the data is usually spread out in a flat surface. Thus, although the density of data stored on a CD/DVD is high in terms of flat surface area, it is sometimes considered low in terms of volume.

BRIEF SUMMARY OF THE DISCLOSURE

Disclosed is an interactive multimedia smart card, otherwise known herein as a multipurpose card, wherein a multimedia card portion incorporates a solid state memory device such as flash memory. The card also includes a credit card shaped, multi-use plastic card which generally can be referred to as a CR-80. The CR-80 may include a smart chip or magnetic strip. The card may have affinity, credit, or debit card capabilities, wherein the card is utilized in a wallet-sized platform. The multimedia card portion and the CR-80 portion both include means for connecting to each other so that the card portions create a stacked relationship relative to each other. The top layer, or the CR-80 portion, includes an otherwise traditional looking plastic affinity, health care, business, credit, debit, or smart card. The bottom layer, or the multimedia card portion, includes a credit card shaped card portion with the flash memory. The multimedia card portion and the CR-80 portion are joined together by locking means, which allows for separation and reconnection by moving the card portions in opposite directions. For example, the card portions may be pulled apart relative to each other. When separated, the CR-80 portion may be used in existing terminal card readers, including those terminal card readers that read information through a smart chip, or a swipe of a bank card, or terminal card readers that utilize motorized card reading mechanisms. The multimedia card portion may be connected by a standard interface, such as a Universal Serial Bus (USB) or IEEE-1394 interface, to a computer for programming.

In one embodiment, the multimedia card portion includes 'wings' which extend from the long sides of the multimedia card portion, as well as a finger hole to facilitate separating the card portions. With one hand, a user can hold one wing with his thumb and hold the opposing wing with his middle and/or ring finger. This grip allows the user to hold the interactive multimedia smart card assembly but avoid touching the CR-80 portion. The user can then poke his index finger through the finger hole against the banking card portion to pop apart the two cards. The finger hole can be positioned off center from the card and/or the wings so that one's index finger can more ergonomically access the hole. The hole can also be elongate to facilitate pressing with a finger as well as symbolically suggest to a user that a finger is supposed to go through the hole.

BRIEF DESCRIPTION OF THE DRAWINGS

FIG. 1 is a top plan view of an interactive multimedia smart affinity card according to a first embodiment of the present disclosure;

FIG. 2 is a rear plan view of the interactive multimedia smart affinity card according to the first embodiment;

FIG. 3 illustrates a rear plan view of the card according to the first embodiment, wherein the multimedia portion of the card is shown rotated in relation to a banking portion of the card;

FIG. 21 is a bottom plan view of the multimedia card portion of the multipurpose card of FIG. 19;

FIG. 22 is a side elevation view of the multimedia card portion of the multipurpose card of FIG. 19;

FIG. 23 is close up view of a protrusion in accordance with an embodiment;

FIG. 24 is a side view of the multimedia card portion of the multipurpose card of FIG. 19;

FIG. 25 is a top plan view of the multimedia card portion of the multipurpose card of FIG. 19.

DETAILED DESCRIPTION OF THE INVENTION

Figure 4:
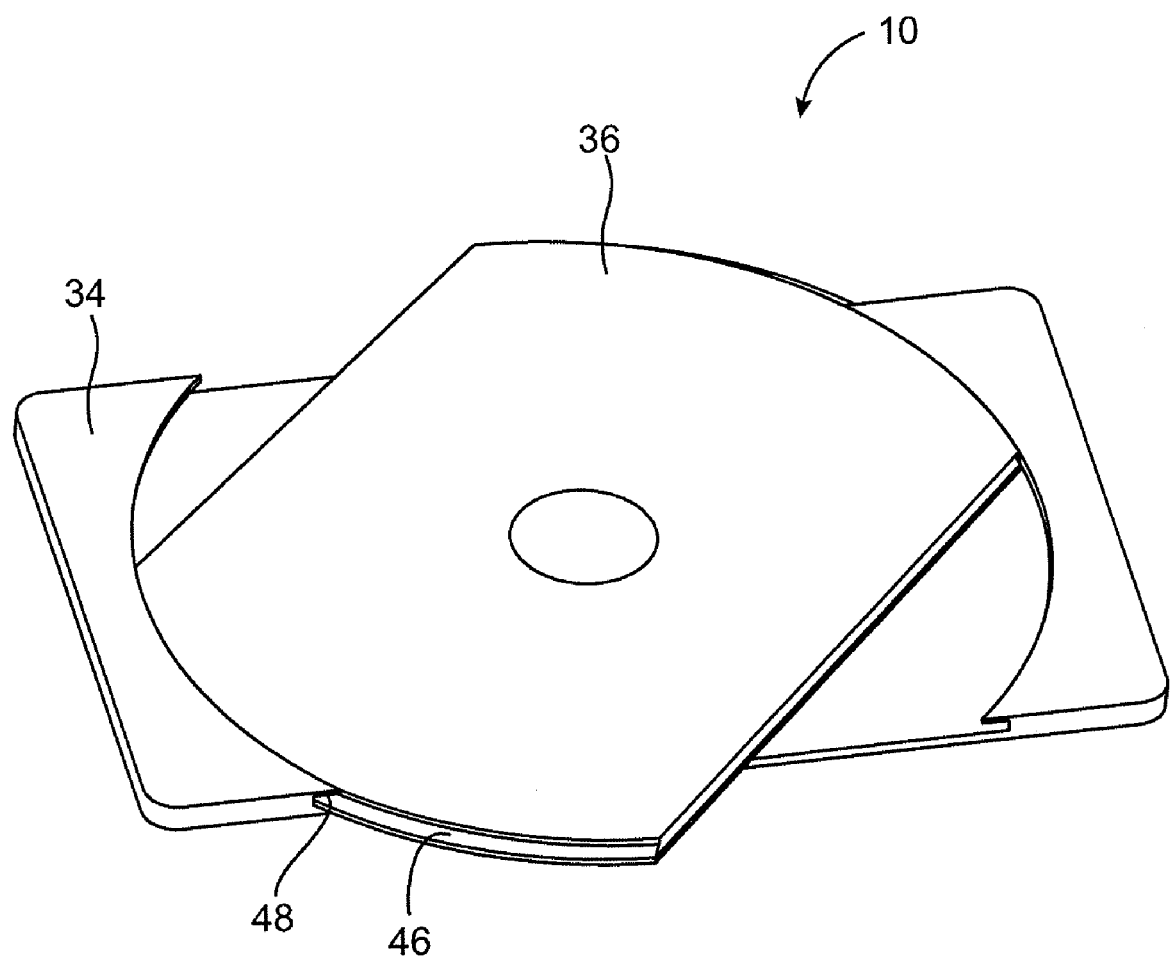
FIG. 4 is a rear perspective view of the card, similar to the view shown in FIG. 3, illustrating the first embodiment.

Disclosed herein is an interactive multimedia smart card incorporating a multimedia card portion that is releasably connected to a banking card or CR-80 portion. The card portions are in a layered or stacked configuration.

As shown in FIGS. 1 through 4, in one embodiment, the multipurpose card includes a bank card portion 32 and a multimedia card portion 36. In FIG. 1, the bank card portion may be an affinity card, a credit card, a debit card, and may include other technologies that can be incorporated into banking cards, as will be further described below. The bank card portion, or second portion, can be in a standard CR-80 (credit card size) form factor.

An affinity card may be offered by two types of organizations: one is a card issuer and the other is a professional association, special interest group or other non-bank company that offer the affinity card. In common use of affinity cards, use of the card entitles holders to special discounts or deals from the non-financial group. For example, in the embodiment shown in FIG. 1, the bank card portion 32 includes a bar code 12 so that the bank card portion may be scanned and provide additional information to a merchant or affiliate.

The bank card portion also may include a magnetic strip or magnetic data 14 that is adhered to the bank card portion so that the bank card portion may be swiped or utilized in motorized card reader mechanisms. For safety and identity verification purposes, the bank card portion may further include a hologram 16 and even an identification photo 30 of the bank card holder. The bank card portion may further include a logo 18 identifying the issuer of the bank card, or an affiliate associated with the issuer of the bank card.

The bank card portion and the multimedia card portion combine to make the multipurpose card 10, which may be in a wallet size card platform for easy carrying by the card holder and allows for convenient storage and distribution by an affiliate or the issuer.

The bank card portion may include a non-contact chip 22. Contactless smart cards (CLSC), sometimes known as RFID cards, are passed near an antenna (reader) without any physical connectivity, to carry out a transaction. They look just like plastic credit cards, except that they have an electronic microchip and an antenna embedded inside. The CLSC components allow the card to communicate with an antenna/coupler unit without any physical contact. Contactless cards are self-powering, i.e., they use the energy of the radio waves emanating from the readers. Contact smart cards should be inserted physically into a smart card reader to initiate a transaction. Typical contact cards have a small square gold plate about ½" in size on the front panel, instead of a magnetic strip on the back like a credit card. When the card is inserted into a smart card reader, it makes contact with electrical connectors that transfer data to and from the chip.

The bank card portion may further include raised data 24 illustrating the bank card number that has been issued by the issuer and to the bank card holder. The raised data 24 also allows for the bank card portion to be swiped by existing mechanical friction swiping mechanisms typically used in a credit card situation, such as at a restaurant or other location that does not have a motorized card reader mechanism.

The bank card portion may further include a smart chip 26 which stores digital data relating to the bank card issuer and the bank card holder. The smart chip 26 also may include information relating to an affiliate of the bank card issuer. The smart chip 26 also may include account balances and other personal information about the bank card holder, making the bank card portion more versatile than typical credit or debit cards.

The bank card portion also may include a replicated signature 28 of the bank card holder, which combined with the identification photo 30 of the bank card holder provides additional security measures in the attempt to prevent fraudulent use by the person other than the actual bank card holder.

As shown in FIG. 2, the multipurpose card has a back side 34 separate from the multimedia card portion 36. The multimedia card portion includes an aperture 35 to allow for the multimedia card to be located in a CD or DVD drive typical in a CD or DVD reader. The multimedia card portion 36 also may include indicia 39, which further provides an opportunity for advertisement for an affiliate or the bank card issuer, or further surface area for printing information relating to the bank card holder. The back side of the multipurpose card 34 also may include an additional barcode 37 to allow for scanning for information relating to the purchase or distribution channels of the multipurpose card 10. The barcode 37 also allows for the multipurpose card to be an item that may be purchased at a point of sale at any location capable of conducting such a transaction.

FIG. 3 further illustrates the relationship between the banking card portion 32 and the multimedia card portion 36 according to one embodiment. FIG. 3 further illustrates a force as shown in the direction of arrow 38 wherein the multimedia card portion is shown being twisted or rotated in relation to the bank card portion. Or in the alternative, the bank card portion 32 can be rotated relative to the multimedia card portion 36. When the card portions are rotated relative to each other, the outer edge 40 of the multimedia card portion is rotated out of an interconnecting groove 42 of the bank card portion revealing an underside 44 of the bank card portion.

FIG. 4 further illustrates the multimedia card portion 36 being rotated relative to the bank card portion 34. The multimedia card portion 36 includes a recessed ledge 46 that slides into and interacts with a lip 48 located on the bank card portion 34. It will appreciated by those skilled in the art that any kind of interlocking relationship or means for releasably connecting the multimedia card portion to the bank card portion may be utilized to achieve the desired results as disclosed herein. Nevertheless, the multipurpose card, as disclosed herein, has a relatively consistent thickness when the two cards are layered or sandwiched together.

Figure 5:
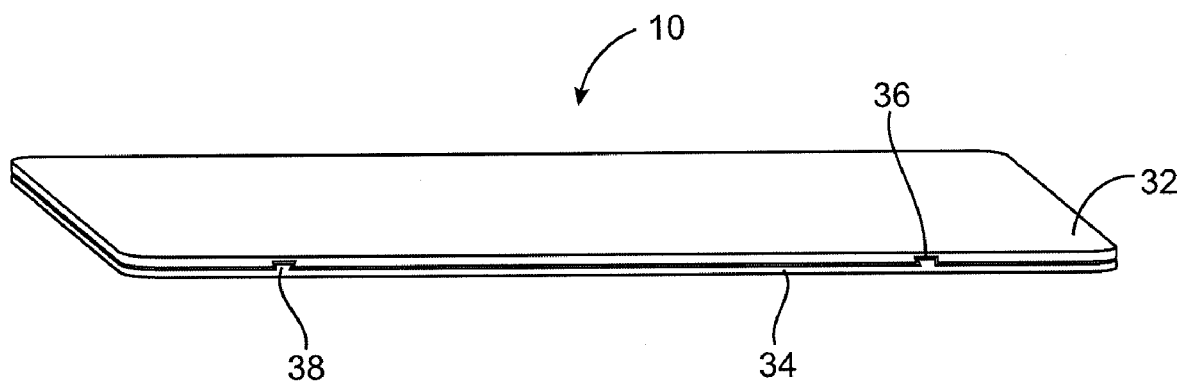
FIG. 5 illustrates a front perspective view of the card according to the present disclosure, illustrating a second embodiment.
Figure 6:
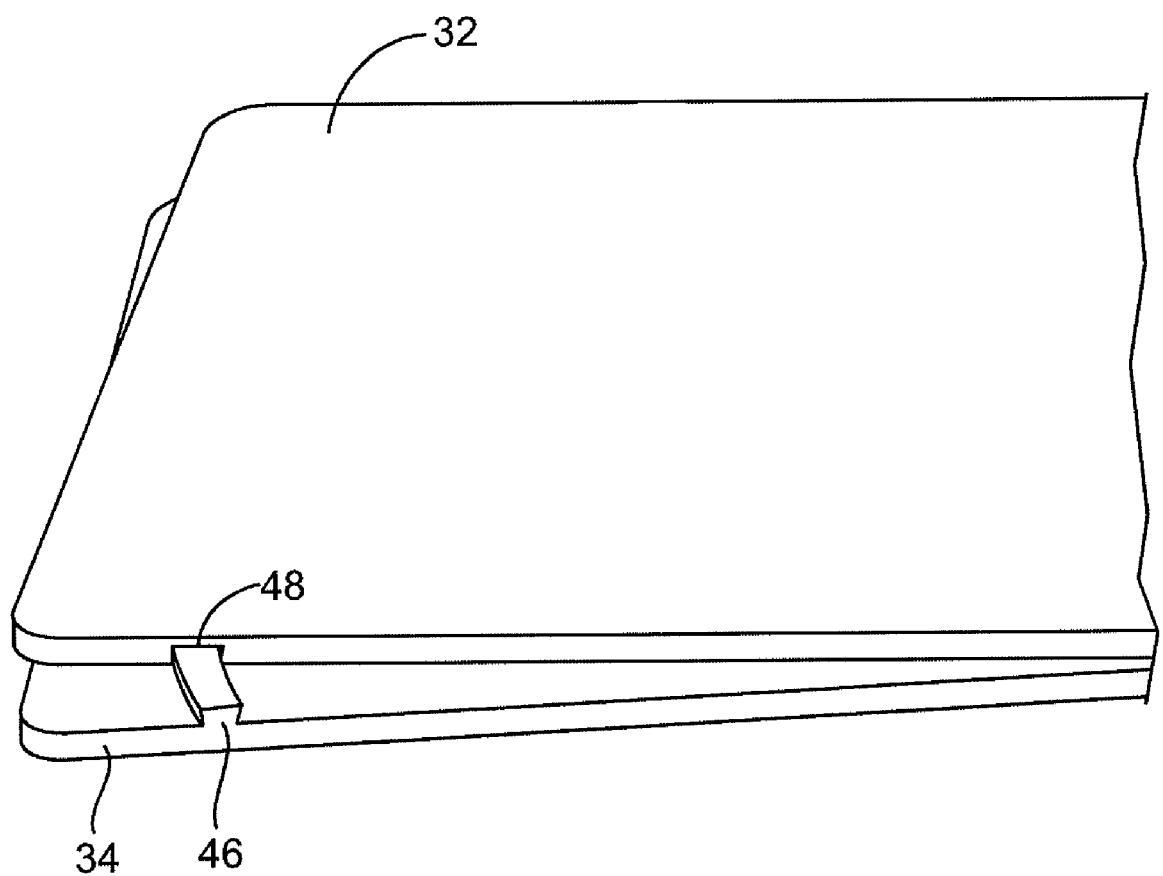
FIG. 6 is a front perspective view of the card according to the present disclosure, illustrating the multimedia portion of the card partially separated from the banking portion of the card, according to the second embodiment.

FIG. 5 illustrates a second embodiment of the disclosed multipurpose card wherein the multimedia card portion 34 includes one or more protrusions or protruding ridges 38 that extends into a recess 36 in the bank card portion 32. A protrusion or ridge 38 releasably interconnects with the a recess 36. This is further shown in FIG. 6 wherein the protrusion or ridge 46 is shown extending into recess 48 and the multimedia card portion is shown partially extended from the bank card portion 32.

Figure 7:
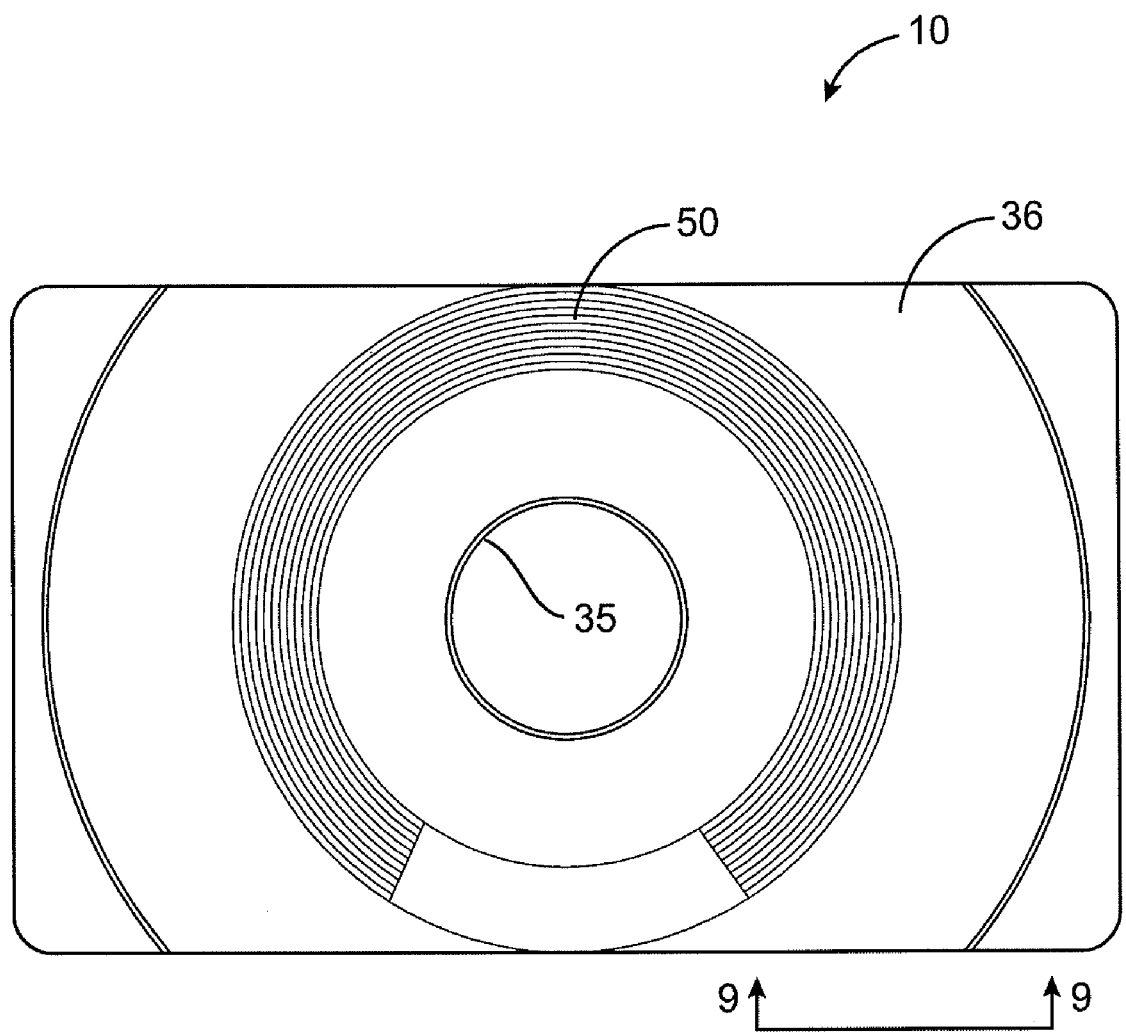
FIG. 7 illustrates a rear plan view of the card according to the second embodiment.

FIG. 7 illustrates a rear plan view of another embodiment wherein the multimedia card includes digitally stored data 50 as seen in this embodiment since the multimedia card portion is made of a relatively transparent material. The aperture 35 is further illustrated in FIG. 7 which allows the multimedia card portion to be utilized in a CD or DVD drive.

Figure 8:
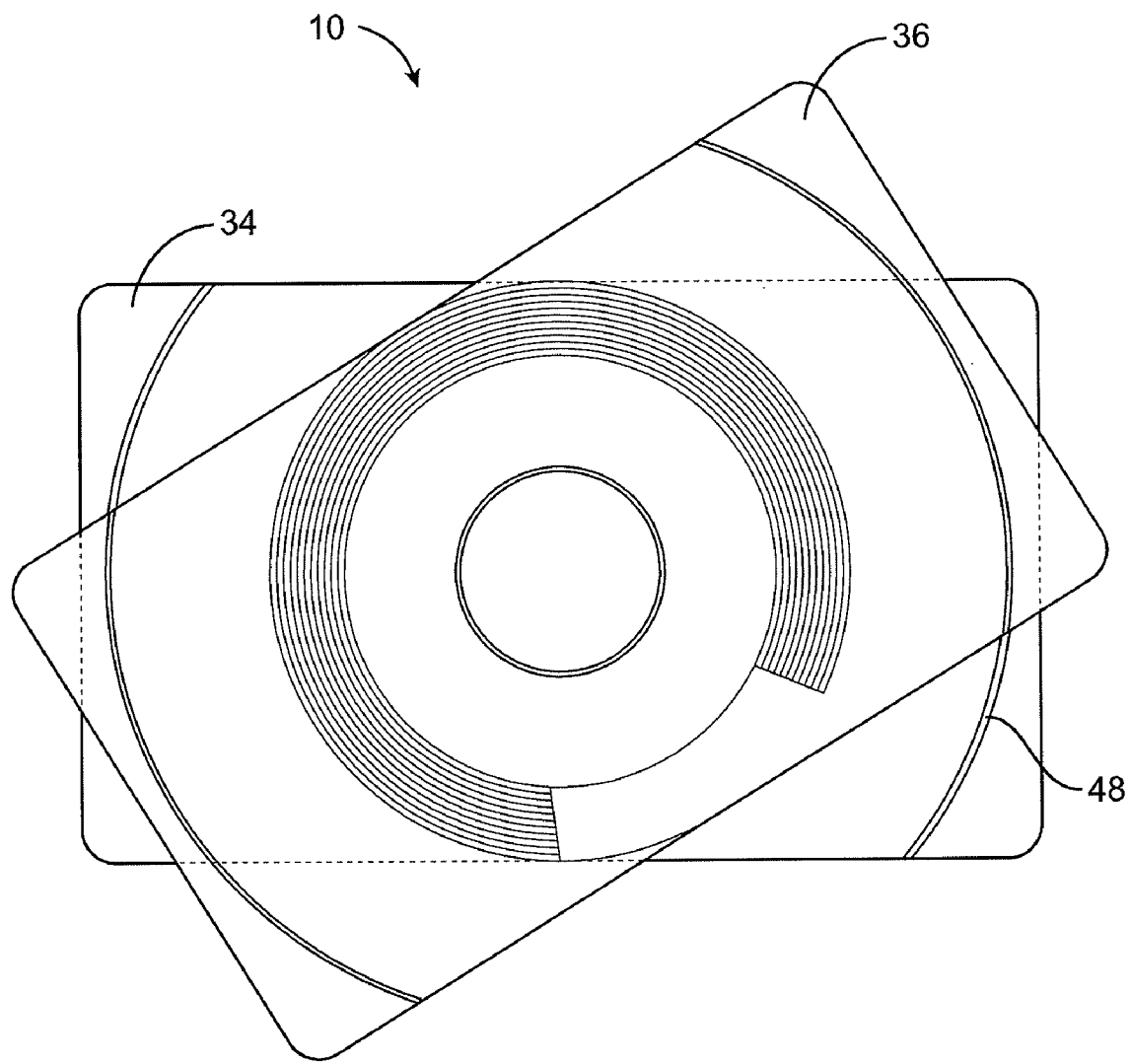
FIG. 8 illustrates a rear perspective view of the card according to the second embodiment, wherein the multimedia portion of the card is shown partially separated from the banking portion of the card.
Figure 9:
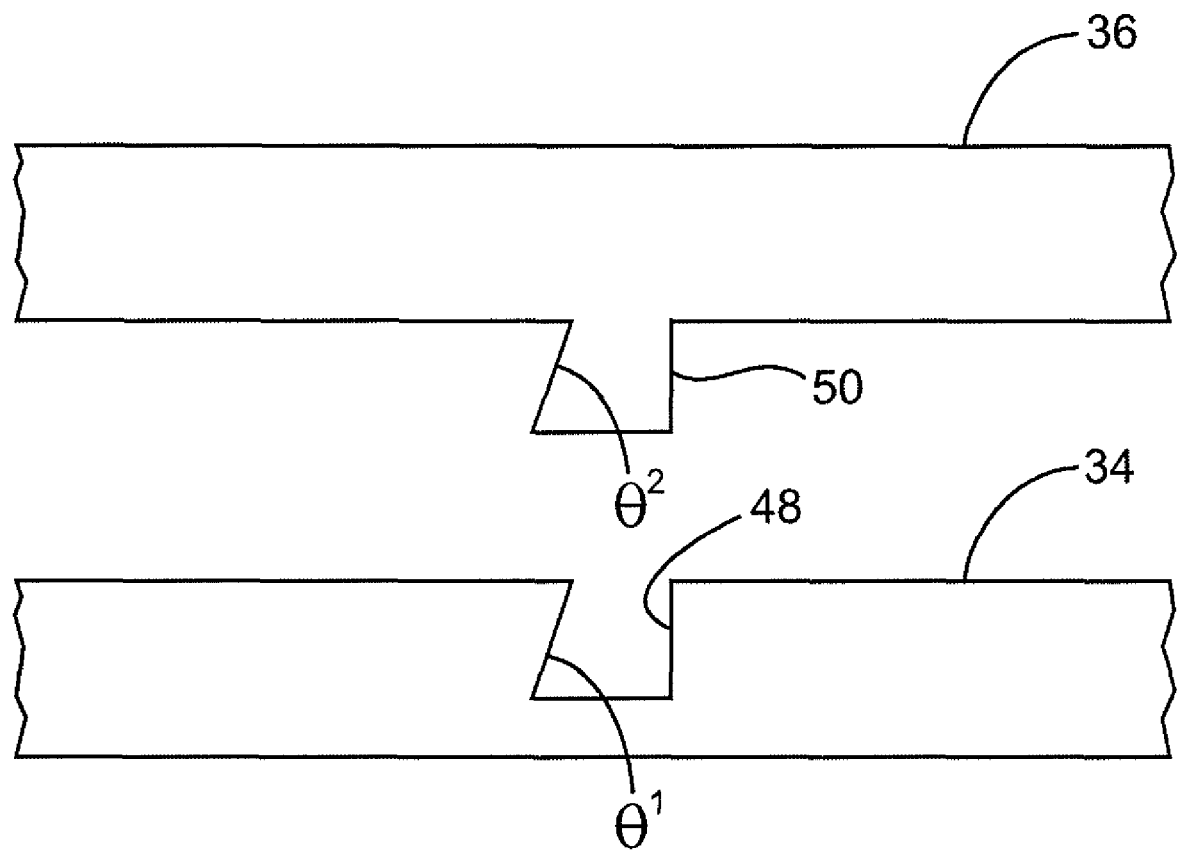
FIG. 9 illustrates a partial exploded front view of the card taken from view 9-9 from FIG. 7 illustrating how the multimedia portion of the card and the banking portion of the card interlock with each other according to the second embodiment.

FIG. 8 illustrates the multimedia card portion 36 being releasably disengaged from the bank card portion 34 and this view further illustrates the recesses 48 in the rear surface of the bank card portion. In this embodiment, the protrusions and the recesses are shown in a radius fashion, however it will be appreciated by those skilled in the art that other geometric configurations which allow for a locking relationship between the multimedia portion and the bank card portion. For example, the protrusions and the ridges can be cooperating on a radius that is much larger but not a straight line across the card portions. In other words, some friction must be provided between the card portions so that the cards do not easily become released from each other. This is further illustrated in FIG. 9 wherein the bank card portion 34 is shown with a recess 48 having an angle $\Theta^1$. Further, FIG. 9 illustrates the multimedia card portion 36 with protrusion 50. Protrusion 50 includes an angle $\Theta^2$ where $\Theta^2$ is greater than $\Theta^1$. FIG. 9 illustrates the protrusion and recess in an exploded view for clarification. The angled relationship of the protrusion 50 and the recess 48 allow for some friction when the card portions are releasably connected together and therefore the portions are not easily removed without the user applying force to one card portion relative to the other. Of course, other interlocking relationships may be utilized, however, according to the present disclosure the bank card portion must maintain a certain thickness, and typically the thickness is 0.033 mil. These thicknesses allow the bank card portions to be utilized in existing terminal card readers and motorized card reader mechanisms. In addition, the protrusion 50 from the multimedia card portion 36 allows for the multimedia card portion to evenly rest in most CD or DVD drives if the drive is positioned in a horizontal relationship relative to the grounds.

Each card is printed on top-quality 0.032 mil polyvinyl chloride (PVC) plastic and serialized to help guarantee durability, security, and full functionality.

Another embodiment is disclosed in FIGS. 10-16. In this embodiment, the multimedia card portion is made of a polycarbonate material and may be a CD, CDR, CDRW, DVD, DVDR, DVDRW, HDDVD, HDDVDR, or a HDDVDRW. These examples are exemplary only, and any future CD or DVD derivative is intended to be within the scope of the present patent.

Figure 10:
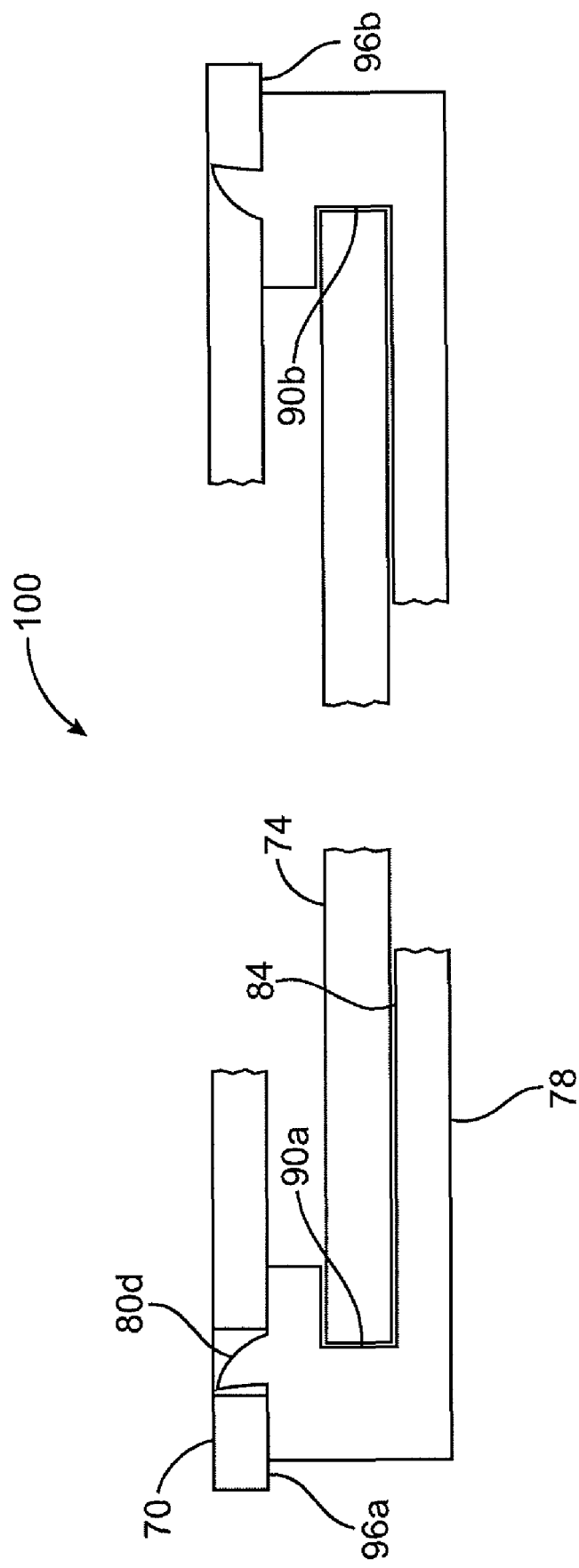
FIG. 10 is a partial cross-sectional view of the multimedia card assembly as according to an alternative embodiment.

In this embodiment, the multimedia card assembly comprises generally of three portions. The three portions are a multimedia cover portion 70, a multimedia card holder portion 78, and the multimedia portion 74. In this embodiment, the multimedia portion 74 is positively held in the multimedia card holder portion 78, as shown in FIG. 10. The multimedia cover portion 70 then removably locks into the multimedia card holder portion 78, generally enclosing the multimedia portion 74.

Figure 11:
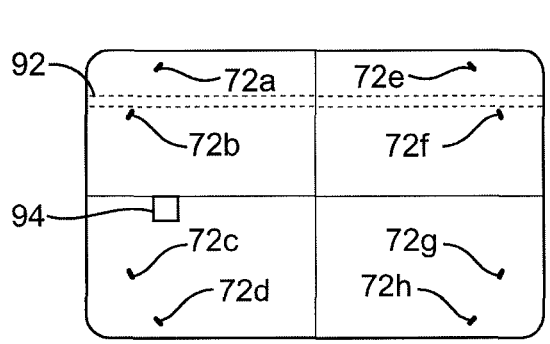
FIG. 11 is a top plan view of a multimedia cover portion according to the alternative embodiment shown in FIG. 10.

Referring now to FIG. 11, the multimedia cover portion 70 may be a bank card, such as a credit card or debit card, or an affinity card, such as a gift card or the like. Therefore, the multimedia cover portion 70 may include a magnetic stripe 92, and/or a smart chip, or other integrated circuit 94.

The multimedia cover portion also includes a plurality of openings 72a through 72h. These openings are oriented to releasably interconnect with protrusions 80a through 80h, respectively, which are oriented on the multimedia card holder portion 78.

The openings and corresponding protrusions can be located symmetrically about the card as shown in the exemplary embodiment, or the openings and protrusions can be arranged asymmetrically. An asymmetric pattern can be designed to facilitate joining and/or separating the card portions. For example, a corner with fewer tiny protrusions/openings than the rest of the card may be designated a "peel here" area. As a user begins to peel the slightly bending card portions away from each other, the effort required to pull the rest of the card portions away from one another is lessened. More protrusions can be added to the end opposite the "peel here" area so that the very last part of the card to peel apart is more controlled. This may help prevent the card portions from un-zipping out of one's control at the very end.

The asymmetric pattern can also be designed to create a sound pattern as the card is peeled apart. The sound pattern can be simple, monotone series of 'clicks,' or the sound pattern can be a series of higher or lower pitch 'clicks' depending on the size and position of each protrusion/hole. For example, a higher pitch click can be played from a more taut area of the card, such as along the natural stress lines of the card as it is bent from the "peel here" area. A lower pitch can be formed from a less taut area, such as the center of the card. Diameters, shapes, lengths, and other features of the protrusions and holes can be altered to design the pitch, snaps, and other audible features of the clicks.

Figure 16:
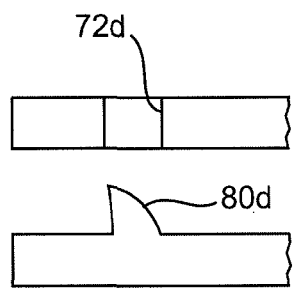
FIG. 16 is a close up cross-sectional side view of a protrusion extending from the multimedia card holder portion and an opening in the multimedia cover portion.

Referring to FIG. 16, a close up view of a protrusion 80d is shown opposed to the mating opening 72d. A positive lock is provided when a protrusion 80 is inserted into an opening 72, locking the multimedia card holder portion 78 to the multimedia cover portion 70. The resulting configuration is shown in the close up view shown in FIG. 10, wherein the multimedia cover portion 70 is releasably affixed to the multimedia card holder portion 78, effectively covering, or enclosing the multimedia portion 74 in the multimedia card assembly 100.

Figure 12:
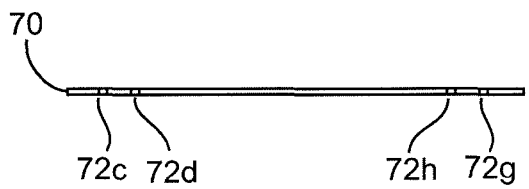
FIG. 12 is a side elevational view of the multimedia cover portion.
Figure 14:
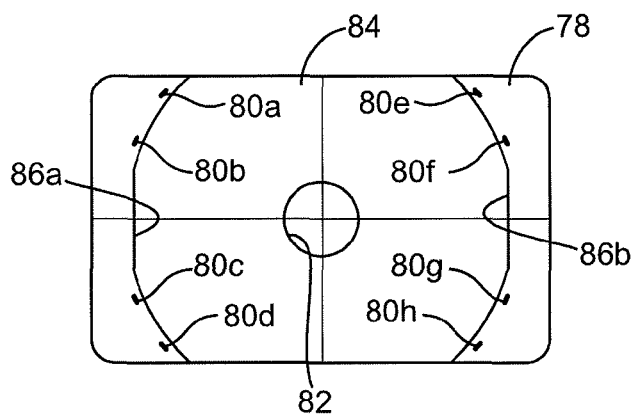
FIG. 14 is a top plan view of a multimedia card holder portion according to the alternative embodiment shown in FIG. 10.

Referring to FIG. 12, a side view of the multimedia cover portion 70 is illustrated. The thickness of the multimedia cover portion 70 is in the range to allow the multimedia cover portion 70 to be utilized as a bank card, or other card as described above. Therefore, the multimedia cover portion 70 may be used in, for example, an Automated Teller Machine (ATM) machine or other bank card swiping or impression type machines.

Figure 13:
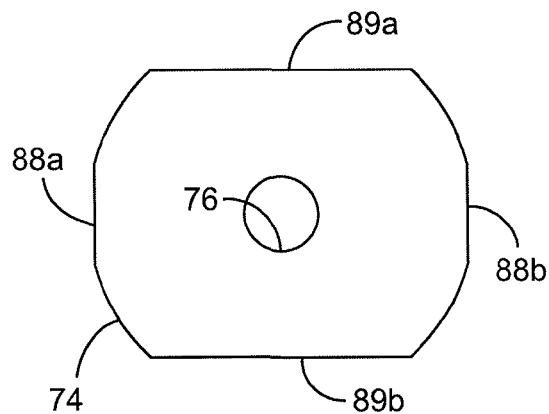
FIG. 13 is a top plan view of a multimedia portion according to the alternative embodiment shown in FIG. 10.

As shown in FIG. 13, the multimedia portion 74 includes a hub opening 76 so that the multimedia portion 74 may be utilized in a CD or DVD tray in a computer utilizing a hub to center the CD or DVD appropriately. The multimedia portion 74 also includes a first side orientation flat 88a and a second side orientation flat 88b. The orientation flats 88a and 88b mate with similar orientation flats in the multimedia card holder portion 78, as will be further described below. The multimedia portion 74 also includes a top flat 89a and a bottom flat 89b which coincides with the configuration of the multimedia card holder portion 78.

The multimedia card holder portion 78 further includes a finger opening 82. The finger opening 82, in conjunction with the overhang 96, as shown in FIG. 10, allows the user to separate the multimedia cover portion 70 from the multimedia portion 74 and the multimedia card holder portion 78. Therefore, in use, the user will insert a finger through the finger opening 82 and through the hub opening 76 to apply pressure to the multimedia cover portion 70, and at the same time, the user will use their thumb and other finger, such as the middle finger or ring finger to apply pressure to the multimedia card holder portion. The user then uses their other hand to grip onto the multimedia cover portion 70 by a first overhang 96a and a second overhang 96b, to separate the multimedia cover portion 70 from the multimedia card holder portion 78. During the separation process, the protrusions 80 are removed from the openings 72.

Figure 15:
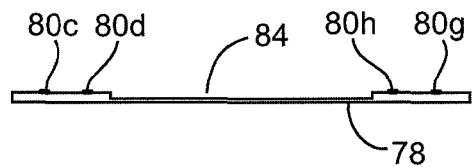
FIG. 15 is a side elevational view of the multimedia card holder portion.

The multimedia card holder portion 78 further includes a recess 84, as shown in FIG. 15. The recess allows for the multimedia portion 74 to be housed in the multimedia card holder portion 78. In operation, the multimedia portion 74 is inserted into the multimedia card holder portion 78 so that the top and bottom flats 89a and 89b are adjacent to the orientation flats 86a and 86b and the multimedia card holder portion 78. The multimedia portion 74 is then rotated so that the orientation flats 88a and 88b are adjacent to the orientation flats 86a and 86b and the multimedia card holder portion 78. As shown in FIG. 10, the multimedia portion 74 is held into place by being housed in an undercut 90a and 90b.

The undercut may be nonexistent in the areas of 86a and 86b in the multimedia card holder portion 78, so that the multimedia portion 74 may be easily released from the multimedia card holder portion 78 with minimal force from the user.

Figure 17:
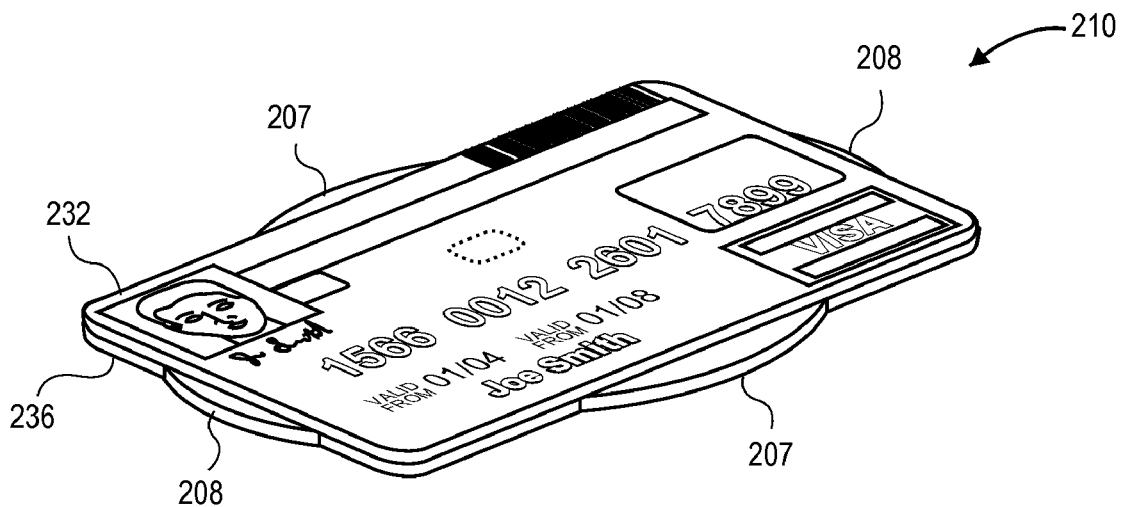
FIG. 17 is a perspective view of a multipurpose card in accordance with another alternate embodiment.

FIG. 17 illustrates a perspective view of a multipurpose card in accordance with another embodiment. Multipurpose card 210 is shown with CR-80 portion 232 attached in a stacked relationship to multimedia card portion 236.

Each wing 207 extends from a long side of multimedia card portion 236, and each wing 208 extends from a short side of multimedia card portion 236. The pairs of wings 207/208 on opposing sides of the multimedia card portion allow a user to hold the sides of multimedia card portion 236 without touching the sides of CR-80 portion 232. This can be important when pulling or popping the card portions apart.

Figure 18:
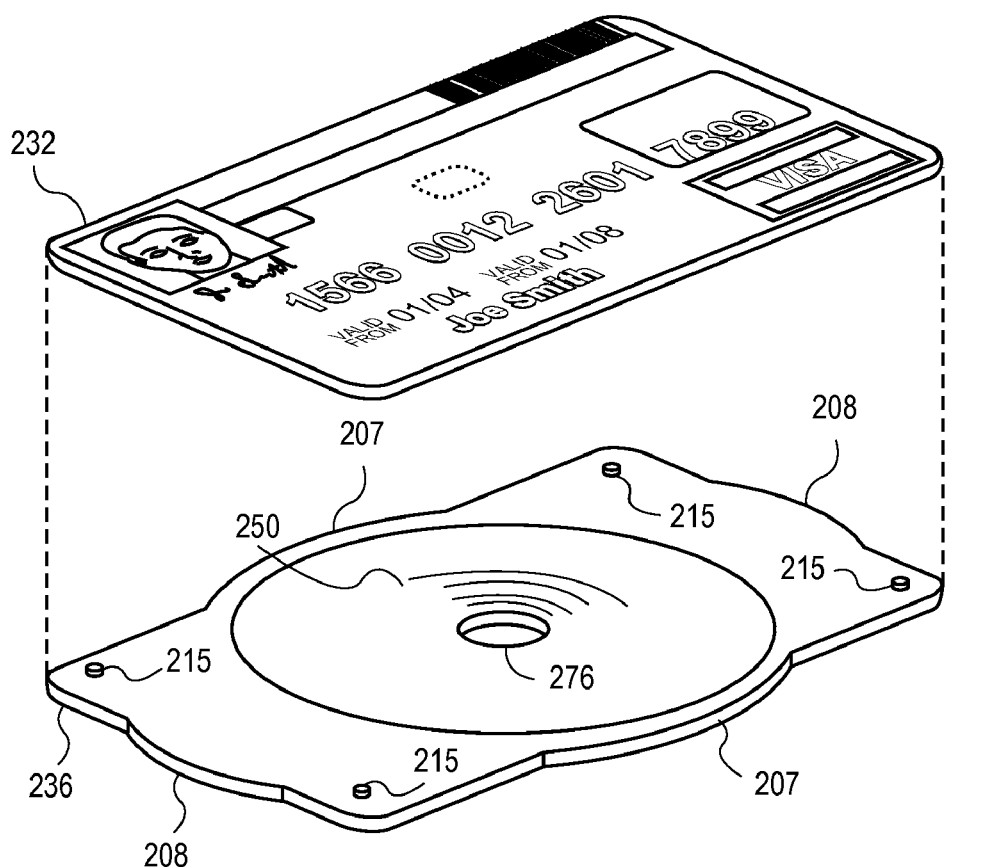
FIG. 18 is an exploded perspective view of the multipurpose card of FIG. 17.

FIG. 18 illustrates an exploded perspective view of multipurpose card 210 in which CR-80 portion 232 and multimedia card portion 236 are separated. Multipurpose card 210 has optically stored data 250. Optically stored data 250 is preferably in a digital format with spiral tracks, such as a CD or DVD format. The CD material is fused or otherwise permanently affixed into what might be termed the bottom card holder. Wings 207 give a little extra room for more data to be encoded in the outermost areas or tracks of optically stored data 250. In the exemplary embodiment, optically stored data 250 extends to a diameter equaling the otherwise full lateral dimension of a CR-80 card (i.e. 53.98 mm), and wings 207 act as a small border of material to protect and frame the side of the CD area. Hub opening 276 in the mass center allows multimedia card portion 236 to be seated on a CD/DVD spindle for high speed rotation.

Protrusions 215 extend perpendicularly from the top face of multimedia card portion 236. Although four protrusions 215 are shown in the figure, more or fewer protrusions can be designed into the card in order to increase or decrease holding power or for other effects.

Figure 19:
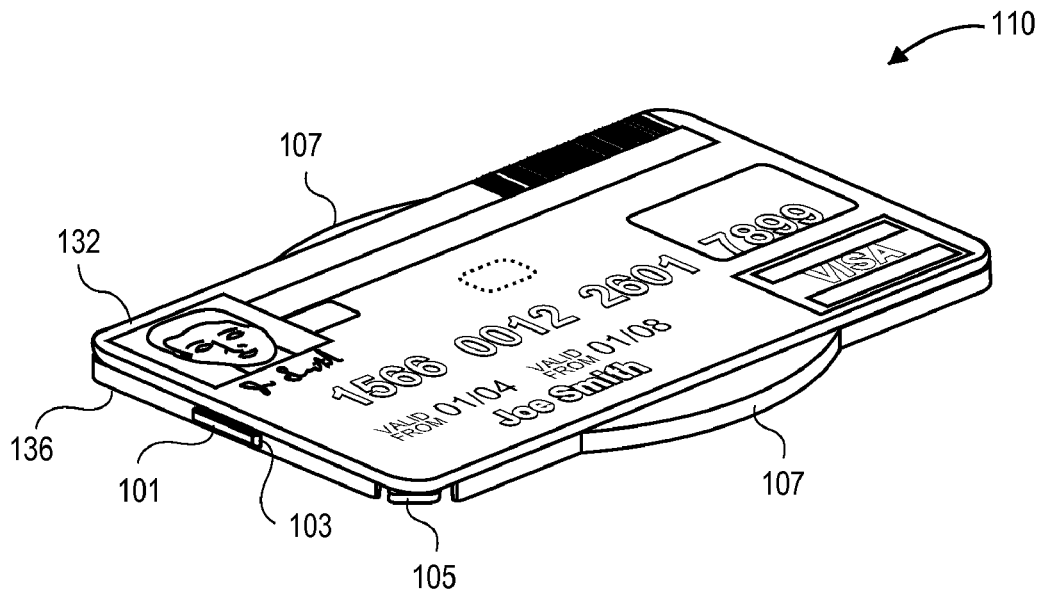
FIG. 19 is a perspective view of a multipurpose card in accordance with yet another alternate embodiment.

FIG. 19 illustrates a perspective view of a multipurpose card in accordance with yet another embodiment. Multipurpose card 110 is shown with CR-80 portion 132 attached in a stacked relationship to multimedia card portion 136. Multipurpose card 110 has flash memory, installed in memory card 101.

Memory card 101 can be a COMPACTFLASH® card, SmartMedia card, MultiMediaCard, Secure Digital card, MEMORY STICK® card, xD card, or any other card having solid state memory suitable for accessing by a computer. A separate memory card may be foregone in favor of a non-removable flash memory or other solid state memory.

Memory card 101 is installed in docking bay 103. Docking bay 103 is adapted to accept memory card 101, such that the docking bay is substantially the same internal dimension as the memory card. Electrical connections (not shown) of the docking bay are in the proper areas to make contact with the electrical contacts of memory card 101. The electrical connections can be made through an adaptor on multimedia card portion 136. Although memory card 101 is enclosed on five sides of docking bay 103, a small part of the memory card juts out from the bay so that a user may more easily remove the memory card as well as verify by sight or touch that it is installed. The small jut out allows room for a fingernail to pull memory card 101 out of docking bay 103. The small jut out can also allow room for a user to depress memory card 101 so that a spring release is engaged which pops the memory card even further out of the docking bay for easy grasping.

In another embodiment, the docking bay can be constructed so that the top and bottom of the memory card are exposed when the memory card is installed in the bay. Rails on each internal side of the docking bay hold the memory card in place. A user may grasp the memory card from the top and the bottom and pull the memory card out of the multimedia card portion in order to change out the memory. Deleting the top and bottom sides of the docking bay also allows the entire multimedia card portion to be made thinner.

Plug 105 provides a connection interface for connecting with external devices or computers and is protected from the top by CR-80 portion 132. In the exemplary embodiment, there is clearance for a connector to connect with plug 105 while CR-80 portion 132 and multimedia card portion 136 are connected.

Each wing 107 extends from a long side of multimedia card portion 136, out from underneath the planform area of CR-80 portion 132. A wing can also be referred to as an overhang. The pair of wings 107 on opposing sides of the card portion allows a user to hold the sides of multimedia card portion 136 without touching the sides of CR-80 portion 132. As a user holds wings 107 with a thumb, middle finger and/or ring finger, the user can poke his or her index finger through elongate finger hole 109 to the face of CR-80 portion 110 which would otherwise be covered by multimedia card portion 136. The force from the user's index finger can push apart the two card portions, resulting in an effortless separation.

Figure 20:
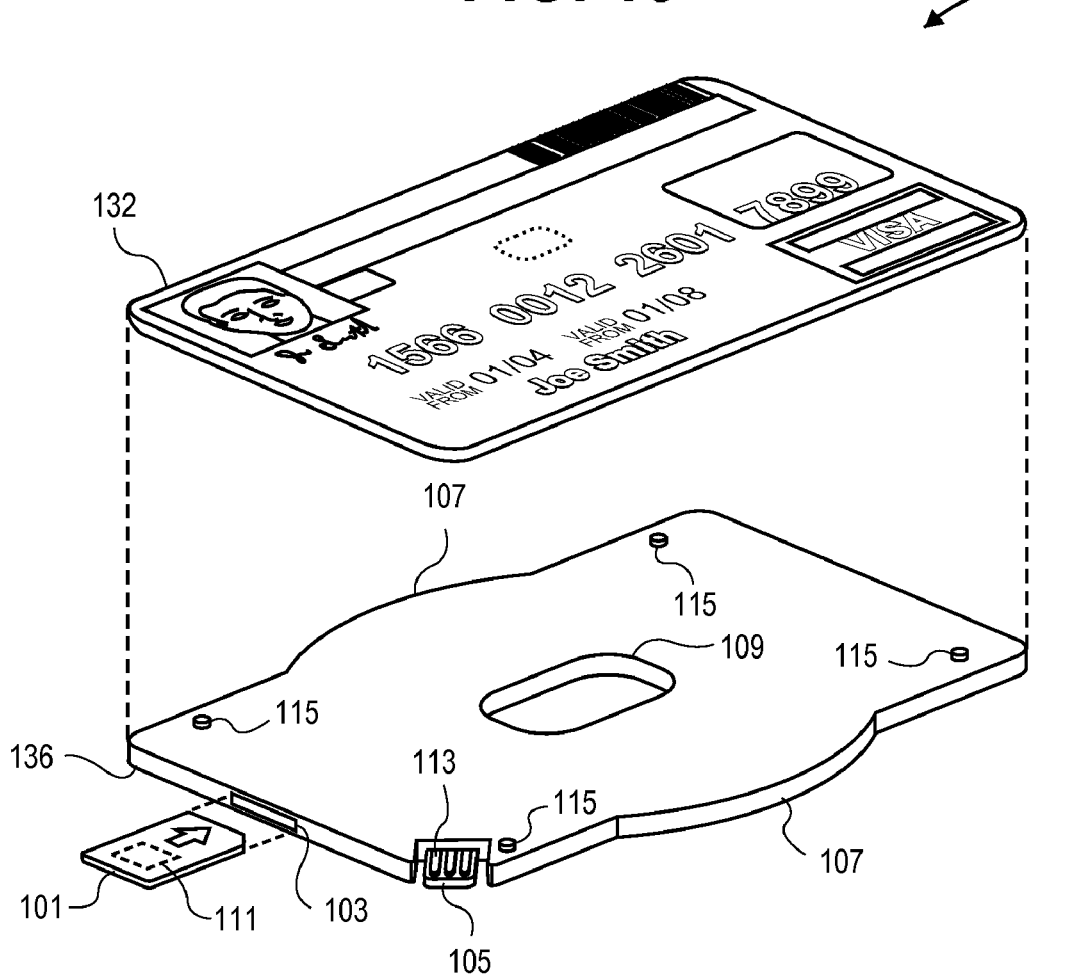
FIG. 20 is an exploded perspective view of the multipurpose card of FIG. 19.

FIG. 20 illustrates an exploded perspective view of multipurpose card 110 in which CR-80 portion 132 and multimedia card portion 136 are separated. Memory card 101, having solid state flash memory 111, is removed from docking port 103.

Plug 105 is fully exposed with room to plug into a connector. Although a female jack can also be used on the card portion as an electrical connector, a male plug takes up less space and thus is better suited to the small confines of the multipurpose card. Being slightly smaller than a corresponding jack, a plug also benefits from being more rigid. In the exemplary embodiment, electrical contacts 113 of plug 105 are placed along the upper surface of the jack so that the metal of the top contacts is protected by CR-80 portion 132 when the card portions are stacked together. Electrical contacts 113 are also placed along the bottom surface of the plug. In another embodiment, placing electrical contacts 113 on the top and not the bottom can protect a user's wallet, purse, pockets, or other clothing or accessories from snagging on sharp edges of the metal contacts.

In certain aspects, wings 107 have a curved shape which prevents snags on clothing and is more comfortable to hold. A constant radius on the curved shape can be easier to manufacture as well as better align with the circumference of a small CD or DVD as described in other embodiments and therefore better protect the CD or DVD.

Finger hole 109 is shown positioned in the center of multimedia card portion 136. However, because the multimedia card portion of this embodiment will not be spun on a CD or DVD platter, it does not need to be mass-balanced around a hole. Therefore, a finger hole can be positioned off center from the card so that one's index finger can more ergonomically access the hole. For example, a finger hole can be placed at a location ⅔ of the way down the lateral axis of the multimedia card portion 136. This can allow more room on the end opposite the finger hole for larger memory cards, internal connection and spring release mechanisms of the docking bay, electrical components, writing on the face of the card portion, and other features.

Finger hole 109 is elongate in the exemplary embodiment. The elongate design can facilitate pressing with a finger. An elongate hole is ergonomic and can symbolically suggest to a user that a finger is supposed to go through the hole. The elongate hole can be diagonal and/or off to one side to better match the mechanics of an index finger pressing down through the hole while the thumb and other fingers are holding the wings.

Wings 107 are shown as centered on opposing sides of multimedia card portion 136. Wings can also be offset from the center of the card portion or offset from one another. These offsets can facilitate the mechanics of a hand holding the card and pressing through the finger hole.

Protrusions 115 extend perpendicularly from the top face of multimedia card portion 136. In certain aspects, protrusions 115 are located substantially near the four corners of the card. Substantially near a corner includes nearer to a corner than to the center of the multimedia card portion, within five protrusion or hole diameters from a corner, and other definitions as known in the art.

FIGS. 21-25 show various plan, elevation, and close up views of multimedia card portion 136 according to one embodiment.

FIG. 21 illustrates a bottom plan view of multimedia card portion 136. Wings 107 are shown with a constant radius in which the center of the radius is not at the center of multimedia card portion 136. Instead, the constant radius is 105 mm, which has been shown to be ergonomic and fit comfortably in a wallet. Finger hole 109 is elongated along the lateral axis of multimedia card portion 136.

FIG. 22 illustrates a side elevation view of multimedia card portion 136. Plug 105 is confined within the planes formed by the top and bottom surfaces of multimedia card portion 136. A plug, jack, or other connector can extend beyond these boundaries.

FIG. 23 illustrates a single protrusion 115 which has been found to work well on PVC or similar plastic cards which are sized as a generic CR-80 credit card. All numeric dimensions in the figure are in millimeters (mm), ±0.01 mm. The 1.65 mm diameter protrusion can be mated into a 1.60 mm diameter hole, wherein the 0.05 mm interference between the protrusion and the plastic surrounding the hole slightly deforms the local material of both the protrusion and the plastic surrounding the hole. This elastic deformation sets up enough static friction along the short length of the protrusion to keep the card portions together until a user pulls the card portions apart. Four protrusions, one near each corner as shown, can be used to keep the two cards portions satisfactorily together.

FIG. 24 illustrates a side view of multimedia card portion 136. Docking bay 103 is centered in the card, but other embodiments can include a docking bay or multiple docking bays which are off-center. The docking bay can be placed off-center to locate it closer to a plug or other electrical connection on the card. The docking bay can also be placed off-center in order to accommodate the placement of the finger hole.

FIG. 25 illustrates a top plan view of multimedia card 136. Protrusions 115 near the corners of multimedia card portion 136 mate with apertures or holes on the opposing CR-80 portion. Plug 105, a physical connection interface for electronically accessing the flash memory, extends from a corner of multimedia card portion 136. Other embodiments can have the physical interface on a side of the card portion or within the finger hole. An interface within the finger hole may be more protected than an interface on the corner or on the side. In either positions, the interface can be positioned so that a connector can be mated and thus the on-board flash memory is accessible by an off-board computer processor.

The physical connection interface, e.g. plug 105, can be a FIREWIRE® connector, a Universal Serial Bus (USB) connector, or any other electrical connector which is suitable for connecting with an off-board device, such as a personal computer, test equipment, ATM, or slot machine. The interface can also include a wireless interface as is known in the art.

Although this disclosure has been shown and described with respect to detailed embodiments, those skilled in the art will understand that various changes in form and detail may be made without departing from the scope of the claimed disclosure.

What is claimed is:

1. A multipurpose card apparatus, comprising:
 a multimedia card adapted to removably receive a solid state multimedia memory device comprising a flash memory card, wherein the flash memory card is received inside the multimedia card;
 a substantially flat second card having a rectangular shape with substantially the same dimensions as a conventional credit card having first means to releasably connect to the multimedia card in a stacked relationship, the multimedia card having second means to releasably connect to the first means, wherein the flash memory card is accessible via an electronic physical connection interface of the multimedia card, wherein the electronic physical connection interface enables reading and writing to the flash memory card by an external multimedia computer processor while the multimedia card and the second card are releasably connected to each other in a stacked relationship, and wherein the substantially flat second card comprises at least one of indicia, raised data, and machine readable data storage, wherein each of the at least one of indicia, raised data, and machine readable data storage comprise data relating to both a cardholder and a card issuer associated with the second card, and wherein the substantially flat second card is separately useable, when detached from the multimedia card and presented to a party, to complete at least one of a credit, debit or affinity card transaction through use of at least the cardholder and card issuer information by the party.

2. The multipurpose card apparatus of claim 1, wherein the flash memory is embedded in the multimedia card.

3. The multipurpose card apparatus of claim 1, wherein the flash memory is enclosed in a memory card selected from the group consisting of a COMPACTFLASH® card, SmartMedia card, MultiMediaCard, Secure Digital card, MEMORY STICK® card, and xD card.

4. The multipurpose card apparatus of claim 1, wherein the solid state memory device is within a memory card, the memory card being releasably connected with the multimedia card portion.

5. The multipurpose card apparatus of claim 4, further comprising a docking bay within the multimedia card, the docking bay adapted to accept the memory card.

6. The multipurpose card apparatus of claim 5, wherein the docking bay is adapted to enclose the memory card on five sides while the memory card is docked in the docking bay.

7. The multipurpose card apparatus of claim 1, wherein the second means to connect the multimedia card to the second card includes a plurality of protrusions extending perpendicularly from a face of the multimedia card.

8. The multipurpose card apparatus of claim 7, wherein the protrusions are located substantially near corners of the multimedia card.

9. The multipurpose card apparatus of claim 7, wherein the protrusions are asymmetrically located about the multimedia card.

10. The multipurpose card apparatus of claim 1, wherein the first means to connect includes a plurality of openings and the second means to connect includes a plurality of protrusions adapted to extend into second card openings to releasably interconnect the multimedia card with the second card.

11. The multipurpose card apparatus of claim 1, wherein the multimedia card includes an elongate hole through the multimedia card, the elongate hole having a size and shape that allows a finger to press against an exposed area of the second card to release the cards from one another.

12. The multipurpose card apparatus of claim 11, wherein the elongate hole is centered in the multimedia card portion.

13. The multipurpose card apparatus of claim 1, further comprising at least one wing extending from at least one side of the multimedia card, the at least one wing extending beyond a planform of the second card when the cards are connected in a stacked relationship, wherein the wings enable a user to grip the at least one wing with a thumb and a finger of a same hand as the thumb without the thumb and finger touching the second card.

14. The multipurpose card apparatus of claim 13, wherein the at least one wing extends from at least one long side of the multimedia card.

15. The multipurpose card apparatus of claim 13, wherein the at least one wing has a curved shape, the curved shape extending smoothly from the at least one side of the multimedia card.

16. The multipurpose card apparatus of claim 1, wherein the second card is a thickness of a bank card.

17. The multipurpose card apparatus of claim 1, wherein the physical connection interface includes a plug.

18. The multipurpose card apparatus of claim 1, wherein the physical connection interface includes a connector selected from the group consisting of an FIREWIRE® connector and a Universal Serial Bus (USB) connector.

19. The multipurpose card apparatus of claim 1, wherein the multimedia card includes a wireless connection interface adapted for electronically accessing the solid state memory device.

20. The multipurpose card apparatus of claim 1, wherein the solid state multimedia memory device is adapted to be accessible by a multimedia processor when the cards are not connected to each other.

21. A multipurpose card apparatus, comprising:
a multimedia card adapted to removably receive a solid state multimedia memory device comprising a flash memory card, wherein the flash memory card is received inside the multimedia card;
a substantially flat second card having a rectangular shape with substantially the same dimensions as a conventional credit card having first means to releasably connect to the multimedia card in a stacked relationship, the multimedia card having second means to releasably connect to the first means, wherein the flash memory card is accessible via an electronic physical connection interface of the multimedia card, wherein the electronic physical connection interface enables reading and writing to the flash memory card by an external multimedia computer processor while the multimedia card and the second card are releasably connected to each other in a stacked relationship, and further comprising at least one wing extending from at least one side of the multimedia card portion, the at least one wing extending beyond a platform of the second card portion when the card portions are connected in a stacked relationship, wherein the wings enable a user to grip the at least one wing with a thumb and a finger of a same hand as the thumb without the thumb and finger touching the second card portion wherein the at least one wing has a curved shape with a constant radius;
and wherein the flat second card is separately useable, when detached from the multimedia card and presented to a party, to complete at least one of a credit, debit or affinity card transaction through use of at least the cardholder and card issuer information provided by the flat second card to the party.

22. A multipurpose card apparatus, comprising:
a multimedia card having a rectangular shape with substantially the same dimensions as a conventional credit card and having a plurality of protrusions extending perpendicularly from a face of the multimedia card, the multimedia card adapted to removably receive a solid state multimedia memory device comprising a flash memory card, wherein the flash memory card is received inside the multimedia card;
a substantially flat second card having a rectangular shape with substantially the same dimensions as a conventional credit card having a plurality of apertures, each aperture adapted to releasably mate with a protrusion of the plurality of protrusions such that the cards releasably connect with each other in a stacked relationship, wherein the flash memory card is accessible via an electronic physical connection interface of the multimedia card, wherein the electronic physical connection interface enables reading and writing to the flash memory card by an external off-board computer processor while the multimedia card and the second card are releasably connected to each other in a stacked relationship, and wherein the substantially flat second card comprises at least one of indicia, raised data, and machine readable data storage, wherein each of the at least one of indicia, raised data, and machine readable data storage comprise data relating to both a cardholder and a card issuer associated with the second card, and wherein the substantially flat second card is separately useable, when detached from the multimedia card and presented to a party, to complete at least one of a credit, debit or affinity card transaction through use of at least the cardholder and card issuer information by the party.

* * * * *